United States Patent [19]

Sakaue et al.

[11] Patent Number: 5,036,544
[45] Date of Patent: Jul. 30, 1991

[54] APPARATUS FOR DISCRIMINATING LINEARITY OF LINE SEGMENT IN IMAGE PROCESSING SYSTEM

[75] Inventors: Yoshikazu Sakaue; Kazuhiko Sumi; Keiji Nakajima, all of Hyogo, Japan

[73] Assignee: Mitsubishi Kenki Kabushiki Kaisha, Tokyo, Japan

[21] Appl. No.: 321,770

[22] Filed: Mar. 10, 1989

[30] Foreign Application Priority Data

Mar. 10, 1988 [JP] Japan .................. 63-57765

[51] Int. Cl.⁵ .............................................. G06K 9/46
[52] U.S. Cl. .......................................... 382/24; 382/21
[58] Field of Search ................... 382/21, 22, 24, 25

[56] References Cited

U.S. PATENT DOCUMENTS

| 4,361,830 | 11/1982 | Honma et al. ................... 382/25 |
| 4,542,412 | 9/1985 | Fuse et al. ........................ 382/56 |
| 4,718,013 | 1/1988 | Shojima et al. ................. 382/21 |
| 4,771,474 | 9/1988 | Takashima et al. ............. 382/24 |
| 4,878,249 | 10/1989 | Mifune et al. ................... 382/21 |

OTHER PUBLICATIONS

"Computer Vision", Dana H. Ballard, Christopher M. Brown, Issued in 1982 by Prentice-Hall, Inc.

Primary Examiner—David K. Moore
Assistant Examiner—Jose L. Couso
Attorney, Agent, or Firm—Wolf, Greenfield & Sacks

[57] ABSTRACT

An apparatus and method for discriminating the linearity of a line segment in an image processing system consisting of elements for extracting and tracking a train of points from a high contrast portion of a video image and for determining whether the position of one of the points exceeds a predetermined threshold value representative of a condition which defines the end of the linearity of the train of points.

8 Claims, 7 Drawing Sheets

PRIOR ART

APPARATUS FOR DISCRIMINATING LINEARITY OF LINE SEGMENT IN IMAGE PROCESSING SYSTEM

FIELD OF THE INVENTION

The present invention relates to an apparatus for discriminating linearity of a line segment obtained from a video signal in an image processing system which can process the video signal transmitted from a television camera or the like.

RELATED BACKGROUND ART

"COMPUTER VISION" by Yoshiaki Shirai, page 169, FIG. 8.12, issued by Shokodo Co., Ltd. on Apr. 30, 1980 discloses a known system used in this kind of linearity discrimination method. FIGS. 1A to 1D show conventional linearity discriminating systems, in which the general construction of the visual information processing systems are respectively illustrated. The optimum system can be selected from among those shown in FIGS. 1A to 1D in accordance with the purpose of a particular use.

Figure 1A:
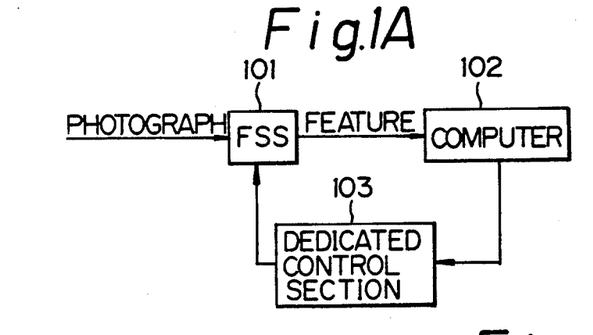
FIGS. 1A to 1D show conventional linearity discrimination systems.
Figure 1B:
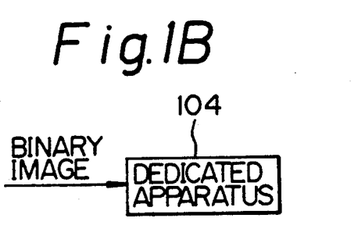
Figure 1C:
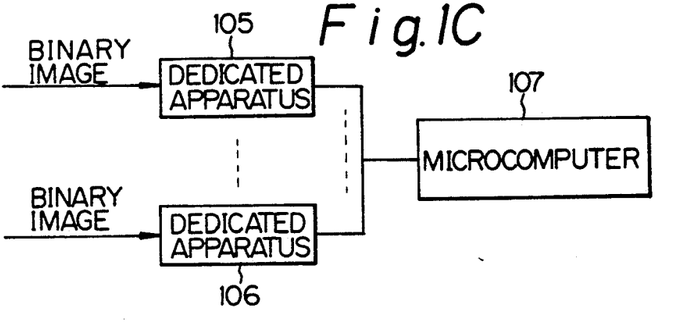
Figure 1D:
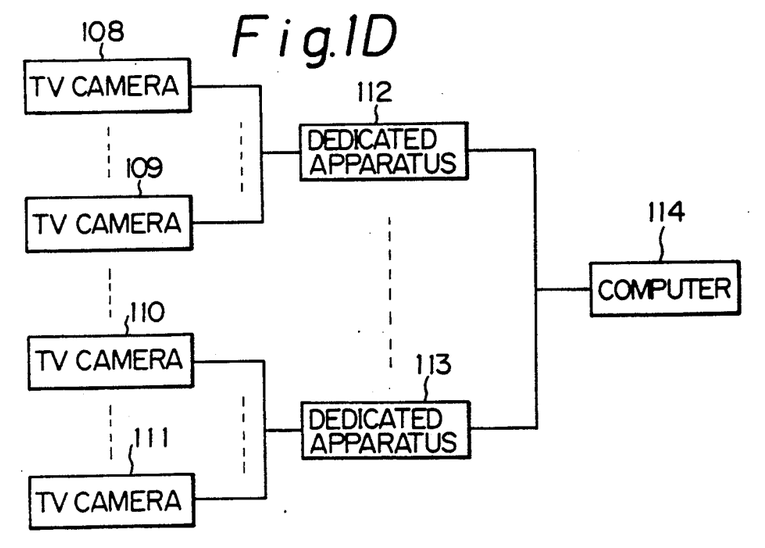

FIG. 1A shows a system for analyzing bubble chamber photography. A flying spot scanner (FSS) 101 is controlled by a dedicated control section 103 and an image feature is discriminated by a computer 102. FIG. 1B shows a system which may be used to detect scratches on a printed circuit board, or to recognize a water supply port and a water exhaust port or a pump system, or the like, and which comprises only a dedicated apparatus 104. FIG. 1C shows a system in which flexible control that cannot be performed solely by dedicated apparatuses 105 and 106 is executed by a microcomputer 107. This system may be used for wire bonding work on IC devices. The system shown in FIG. 1D is suitable for use in a case where an object is observed by TV cameras 108 to 111 so that tasks can be executed on the basis of the observed object. Since dedicated apparatuses 112 and 113 need not operate while the relevant work is being conducted, the signals from a plurality of TV cameras can be processed by a single dedicated apparatus. The system of FIG. 1D is also used to execute wire-bonding work on IC devices or transistors. Reference numeral 114 denotes a computer.

Figure 2A:
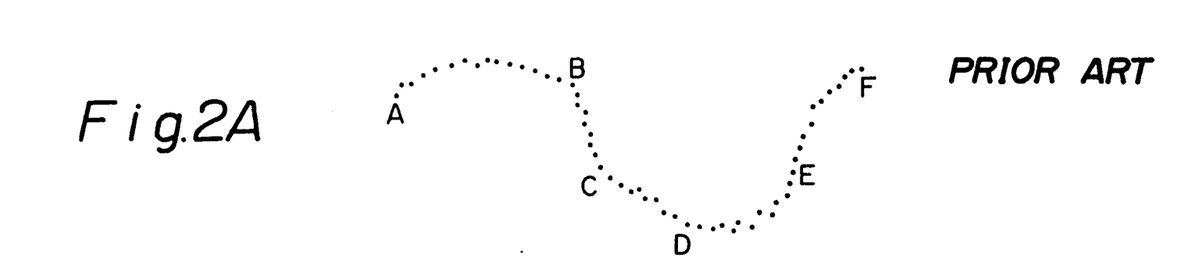
FIGS. 2A to 2C are wave-form diagrams illustrating an operation of the conventional system.
Figure 2B:
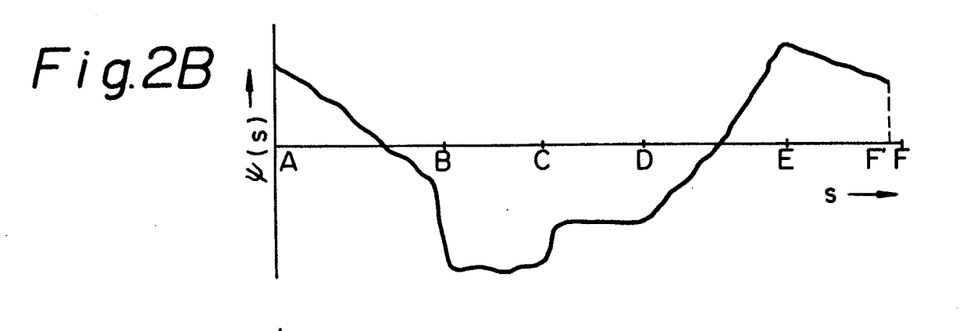
Figure 2C:
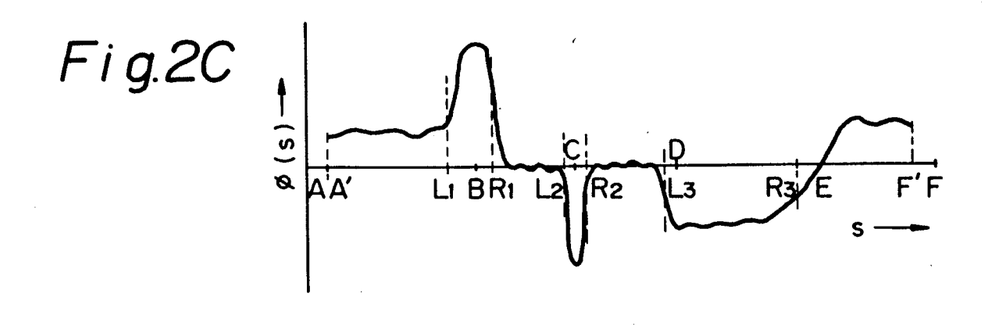

Returning to the above-mentioned publication, reference will be made to the portion from page 36, which is directly concerned with the subject matter of the present patent application. FIGS. 2A to 2C correspond to FIG. 2.24 in the publication. FIG. 2A shows a train of points which can be obtained from the input image. It is to be noted that the direction of the train of points is defined by the direction of a line connecting that point and a point which precedes that point by k points. Assuming that the distance from point A as measured along the train of points is s, the direction $\psi(s)$ at each point in the straight line portion is almost constant, and the gradient of $\psi(s)$ in the arc-like portion is constant (FIG. 2B). Assuming that the curvature $\phi(s)$ at each point in the train of points is defined by the difference between the direction of that point and the direction of a point which precedes that point by m points, the curve shown in FIG. 2C can be obtained. The curve shown in FIG. 2C can be divided into straight lines and arcs in accordance with the following steps:

(1) Obtaining intervals including distinct nodes, e.g. [L1, R2], [L2, R2], and intervals including clear curves, e.g., [L3, R3];
(2) Classifying intervals, [A', L1], [R1, L2], ect., other than the intervals obtained by the step (1) into three kinds of intervals including straight lines, curves and unclear lines, and trying to further divide a relatively long interval including curves in the classified intervals into straight lines and curves;
(3) Connecting the adjacent intervals, if possible; and
(4) Determining the positions of the nodes.

The comments of the author of the above-mentioned publication with repect to the above steps will be directly cited from the publication.

"This method is also fairly complicated and it is almost impossible to express it as an equation. It is inherently impossible to perform this division according to the inspiration of a human being by a simple method."

As described by the author of the publication, it is very difficult to generate any contour line and to divide it into straight lines and arcs in a visual recognition apparatus. Further, in order to realize a practical visual recognition apparatus a practical recognition speed must be obtained. To allow the foregoing discriminating to be arithmetically operated by a computer, repetitive and complicated arithmetic operations are in appropriate. In the foregoing method, for instance, in the case where a point proceeds that point by, for example, k points or m points, if the distance between such points is large, any fine change in the curve is averaged and hence cannot be detected. Conversely, if the distance is small, any gentle slight change in the curve is overlooked, or too many concave and convex portions will be undesirably detected due to so-called noises. It is, therefore, necessary to execute many arithmetic operations due to the variety of distances involved and, thereafter, to select a proper one from the results of the arithmetic operations. In addition, since according to the above-mentioned publication, "Intervals are classified into three kinds of intervals including straight lines, curves and unclear lines. An attempt is made to further divide a relatively long interval including curves into curves and straight lines", it is impossible to predict the number of times arithmetic operations will have to be repeated. Thus such a system can be considered an inconvenient system in practical terms. More particularly, in recent years there has been an increasing tendency for dedicated electronic circuit used for arithmetic operations to be designed to reduce the arithmetic operating time and to increase the speed at which the linearity of a line in an image is recognized. However, it is practically impossible to prepare enough electronic circuits to meet the maximum number of times which it can be predicted the relevant arithmetic operations may have to be repeated.

SUMMARY OF THE INVENTION

The present invention comprises a linearity discrimination apparatus for use in an image processing system which is intended to overcome the problems of the conventional techniques mentioned above.

It is an object of the present invention, therefore, to provide an apparatus for discriminating linearity of a line segment in an image to be displayed which can be processed in an electronic image processing system, which comprises means for tracking a train of points or a line which is extracted from a portion having a relatively large bright/dark change in the image; and means for obtaining a first point spaced by a predetermined distance from a new point on at least one side of the train of points or the line, which has been added to the train of points or the line by the tracking means, and for discriminating the linearity of the train of points or the line by determining whether or not the position of the first point exceeds a predetermined threshold value representative of a condition which defines the end of the linearity of the train of points or the line.

It is another object of the present invention to provide an apparatus for discriminating linearity of a line segment in an image to be displayed which can be processed in an electronic image processing system, which comprises means for tracking a train of points or a line which is extracted from a portion having a relatively large bright/dark change in the image; means for obtaining a first point spaced by a predetermined distance from a new point on at least one side of the train of points or the line, which has been added to the train of points or the line by the tracking means, and for discriminating the linearity of the train of points or the line by determining whether or not the position of the first point exceeds a predetermined threshold value representative of a condition which defines the end of the linearity of the train of points or the line; and the discriminating means including means for previously obtaining (i) a point which precedes the new point on the train of points or the line and (ii) a second point spaced by a predetermined distance from the preceding point and for providing the length of a line segment between the preceding point and the second point as the threshold value, and means for comparing the length of a line segment between the new point and the first point with the threshold value.

It is still another object of the present invention to provide an apparatus for discriminating linearity of a line segment in an image to be displayed which can be processed in an electronic image processing system, which comprises means for tracking a train of points or a line which is extracted from a portion having a relatively large bright/dark change in the image; means for obtaining a first point spaced by a predetermined distance from a new point on at least one side of the train of points or the line, which has been added to the train of points or the line by the tracking means, and for discriminating the linearity of the train of points or the line by determining whether or not the position of the first point exceeds a predetermined threshold value repesentative of a condition which defines the end of the linearity of the train of points or the line; and the discriminating means including means for previously obtaining (i) a point which precedes the new point on the train of points or the line and (ii) a second point spaced by a predetermined distance from the preceding point and for providing an included angle which is formed by a first line segment between the preceding point and a start point of the train of points or the line and a second line segment between the second point and the start point as the threshold value, and means for comparing an included angle which is formed by a third line segment between the new point and the start point and a fourth line segment between the first point and the start point with the threshold value.

According to the linearity discrimination apparatus of the invention, linearity discrimination can be performed by providing limit lines which have a predetermined width between each with reference to a straight line which is previously tracked by connecting a train of points, so that discrimination close to the feeling of a human being can be attained.

In addition, according to the linearity discrimination apparatus of the invention, it is sufficient to solely discriminate whether a new point added to the tracked train of points is positioned outside a predetermined limit angle or not, whereby the arithmetic operations can be desirably simplified. Also, an arithmetic operation for a new limit angle for a straight line to which a new point has been added can also be kept simple and there is no element which requires any repetitive arithmetic operation.

According to the linearity discrimination apparatus in the image processing system of the present invention, the limits which indicate whether the end of linearity of a train of points or a line has been detected when a new point to be tracked is coupled to the train of points are provided by two upper and lower angles with reference to the train of points.

It is easy, therefore, to discriminate the linearity of a line by using a simple comparison operation with the limit angles.

It is also easy to obtain the limit angles from the starting point of the train of points by using a simple arithmetic operation.

It is also easy to detect any slight change in direction in a relatively long train of points as well as a relatively short train of points.

It is also easy to detect or ignore any concave or convex portion in the train of points by providing various threshold values.

DETAILED DESCRIPTION OF PREFERRED EMBODIMENT

An embodiment of the present invention will be described hereinbelow with reference to the drawings. Prior to explaining the embodiment of the invention, the linearity discrimination principle of the present invention will first be explained in practical terms with reference to FIG. 3.

Figure 3:
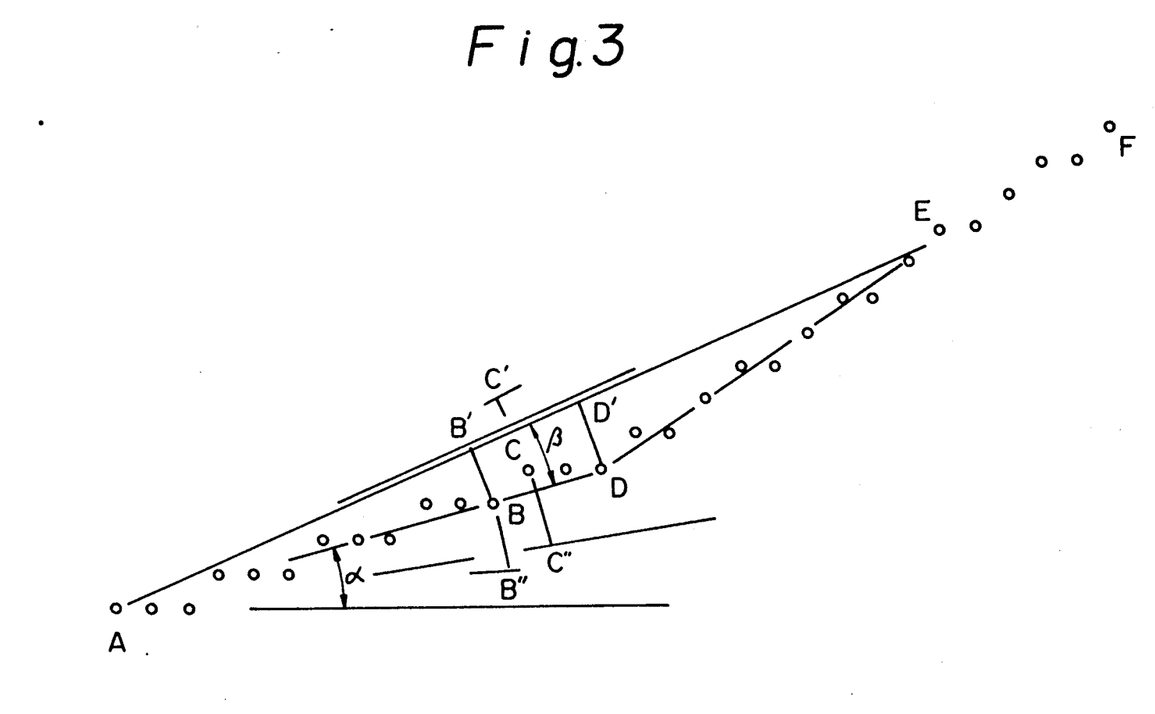
FIG. 3 is a diagram explaining the principle of discriminating the linearity of a line segment in an image according to an embodiment of the present invention.

In FIG. 3, it is assumed that a train of points A-F exists and changes direction at a point D. In order to detect the fact that the straight line depicted by the train of points changes direction, it is necessary to provide a certain threshold value. Now, assuming that the threshold value is given by the length of a line segment D—D', the train of points cannot be expressed by a single straight line at point E and, therefore, it becomes essential for a new straight line to employed to express the train of points.

In other words, when the train of points exceeds or crosses an extension of a line segment A—D' at point E, the end of linearity (line segment A—D) can be indicated. In this case, if the angle of the line segment A—D', for instance, the angle ∠D'AD (β) is known, the fact that the train of points has crossed the extension of the line segment A—D' can be conveniently detected simultaneously with the completion of the tracking operation of point E. The arithmetic operation of computing the angle ∠D'AD can be easily obtained from the length of the line segment A—D. Since the angle ∠D'AD exists on the inside of the angle of the line segment A—B' which has previously been computed at point B, for instance, an angle ∠B'AB, if the angle ∠D'AD is stored as a threshold value, the linearity of the train of points can be even more accurately detected on the basis of the angle ∠D'AD as compared with the angle ∠B'AB. It is to be noted that similar angles which are obtained at point D and subsequent points do not exist on the inside of the angle ∠D'AD.

Although the case where the train of points changes direction upwardly has been explained above with respect to the limit lines A—B', A—C', A—D' and so forth, it is to be understood that limit lines A—B", A—C" and the like can be prepared to discriminate the linearity of the train of points even if it changes direction downwardly.

If the straight line is bent at point E, it can be understood that the straight line to point D at which the last limit line has been determined is a first straight line and then the straight line from point D is regarded as a new or second straight line.

The apparatus of the embodiment can be adapted to discriminate the linearity of a train of points on the basis of the above-mentioned principle. Although a block diagram according to the embodiment is similar to those shown in FIGS. 1A to 1D which are cited as the conventional systems it will be further explained with reference to FIG. 4 for the sake of convenience. In the diagram, reference numeral 1 denotes a television (TV) camera adapted to receive an image and 2 indicates a visual recognition apparatus comprising the following internal components. That is, reference numeral 3 denotes a buffer unit adapted to receive a video signal from the TV camera 1; 4 indicates an A/D converter adapted to convert an analog output signal from the buffer unit 3 into a digital signal; 5 a differentiating circuit adapted to differentiate the digital signal from the A/D converter 4; 6 a fine line forming circuit adapted to form fine lines from an output signal of the differentiating circuit 5; and 7 a frame memory adapted to store differentiated and fine-line formed signals. The frame memory 7 is also connected to a computer 8. By addressing the frame memory 7 from the computer 8, the stored signals can be read out therefrom. The read-out signals can be output through the computer.

Figure 4:
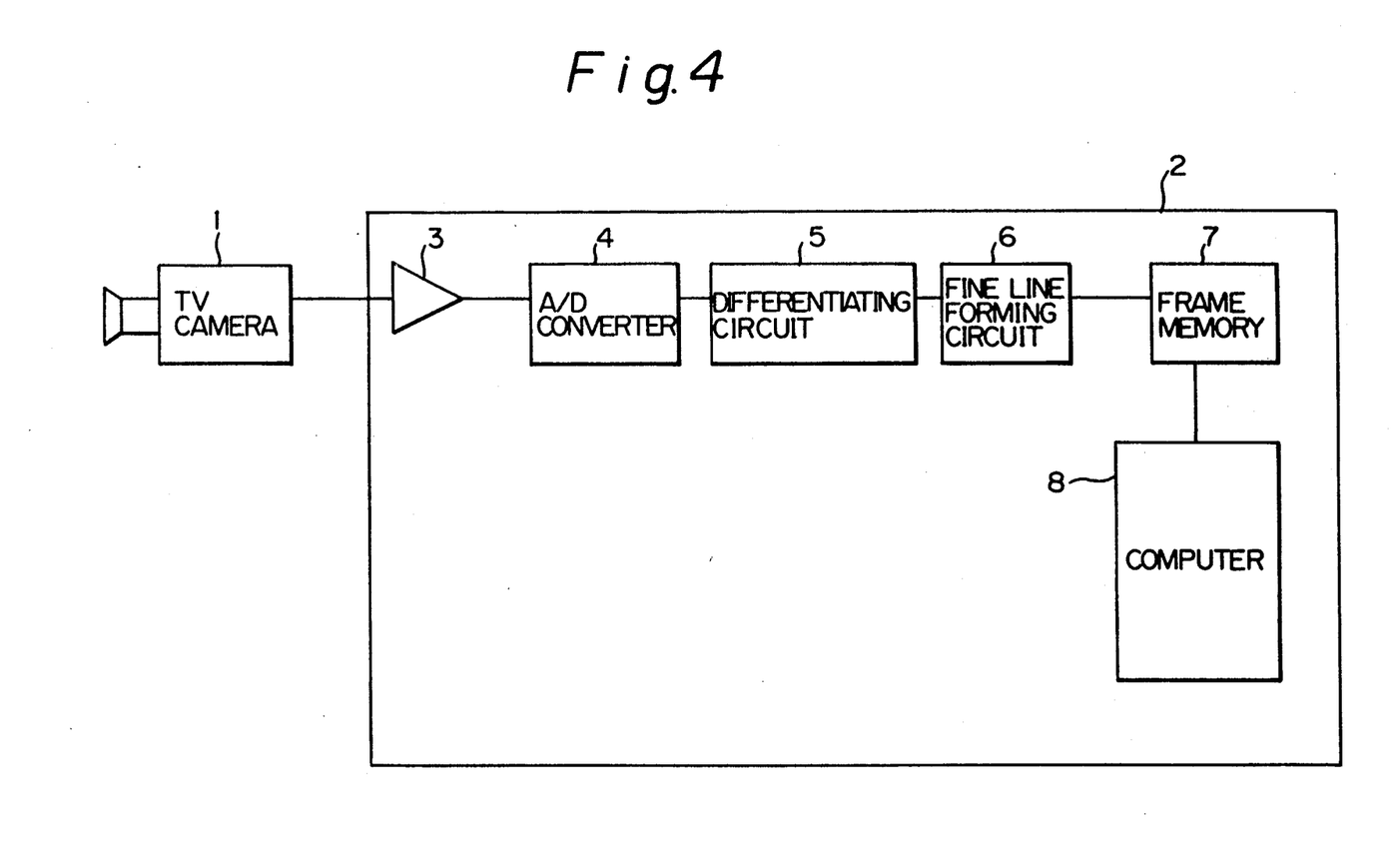
FIG. 4 shows a block diagram of an apparatus for discriminating the linearity of a line segment in an image according to the invention.

The operation will now be explained. The video signal from the TV camera 1 is converted into digital signal consisting of eight bits by the A/D converter 4. The digital signal is then differentiated in the vertical and lateral directions by the differentiating circuit 5, so that a distinct line is generated from a portion showing a relatively large change in brightness, such as a contour of an image which is shot by the TV camera. The fine line forming circuit 6 performs a fine line forming processing such that a fine line is produced at a center of the differentiated line with a given width. Then processes which are conventional and well known are sequentially executed in accordance with the order of the signals input from the camera and the input signals are successively stored in the frame memory 7. By addressing the frame memory 7 from the computer 8, the addressed signal is then read out therefrom. The read-out signal can be given as an L (low) level signal which indicates a portion showing a relatively small bright/dark change in the image, or as an H (high) level signal which indicates a portion having a relatively large bright/dark change such as a contour of the image, and which corresponds to a one-bit signal. A series of H level signals can be expressed as a train of points or a line.

Figure 5:
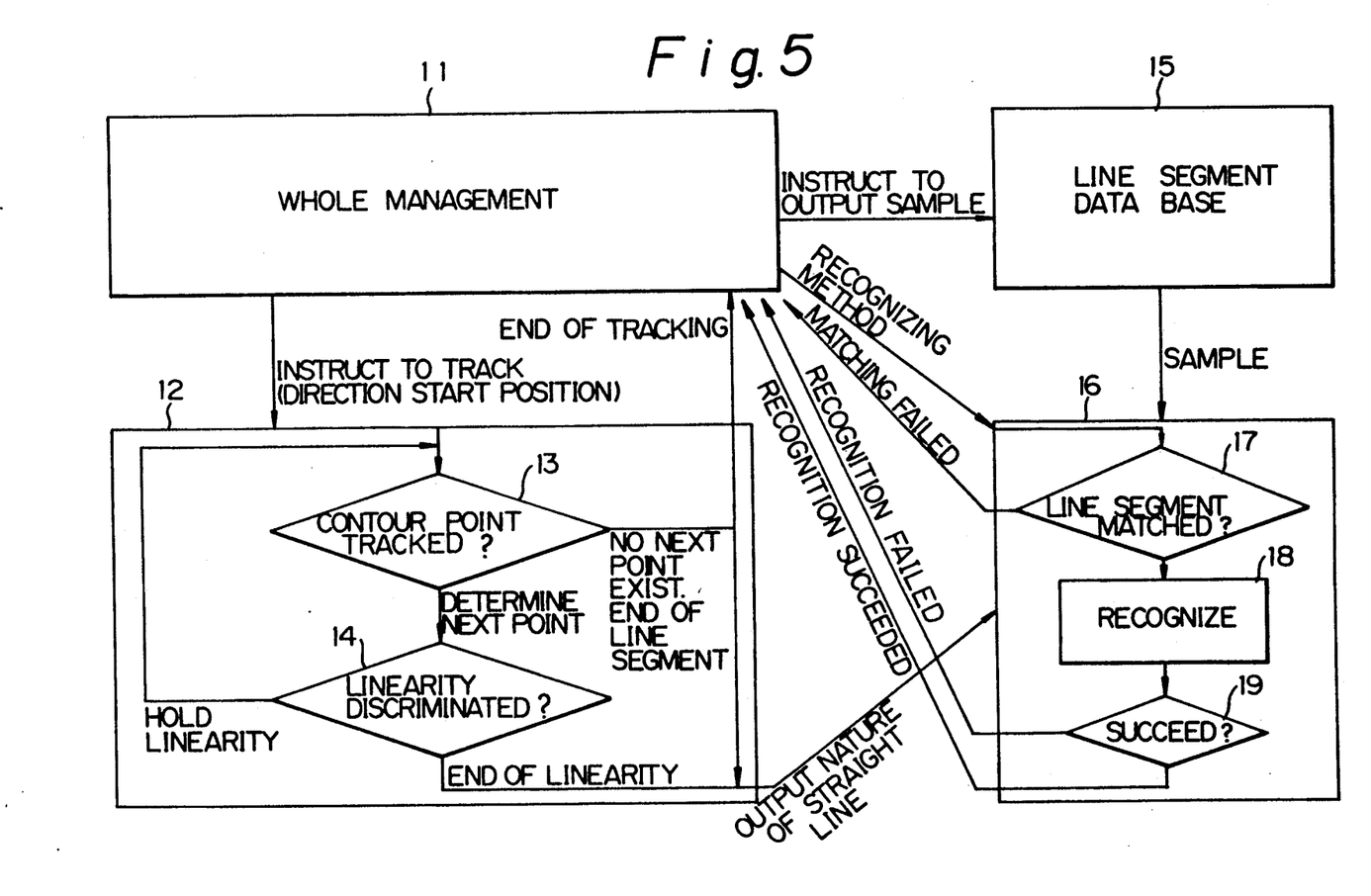
FIG. 5 is a chart illustrating concepts which are arithmetically computed by the computer shown in FIG. 4.

Arithmetic operations which are executed by the computer 8 shown in FIG. 4 will now be explained with reference to FIG. 5. In the diagram, reference numeral 11 denotes a processing section adapted to manage all the arithmetic operations of the computer and to provide various instructions for the slave sections. Reference numeral 12 denotes a track processing section adapted to read out the frame memory 7 and to successively track and couple the read-out signals or the pixels on the contour of the image. In the section 12, reference numeral 13 denotes a tracking process section adapted to look up any point on the contour which has not yet been coupled in an area around the lastly coupled point, and reference numeral 14 denotes a linearity discriminating processing section which is newly provided by the invention. The section 14 can determine or discriminate whether the track train of points to which a new point has been added should be retained as a straight line or should be divided into two straight lines. After this discrimination has been completed, the nature of the straight line is transmitted to a recognition processing section 16. On the other hand, an instruction is transmitted from the whole management processing section 11 to a line segment data base 15 so that the nature of a contour of the image, which has to be recognized, is provided from the data base 15 to the recognition processing section 16. Then, by utilizing a line segment matching processing section 17 in the recognition processing section 16, the nature of the contour is compared with nature of the straight line transmitted from the track processing section 12. If they coincide, a feature of an image or object to be recognized, which is being photographed by the TV camera, can be decided, taking into account the straight lines or the line segments which have been determined to be coincident.

Figure 6A:
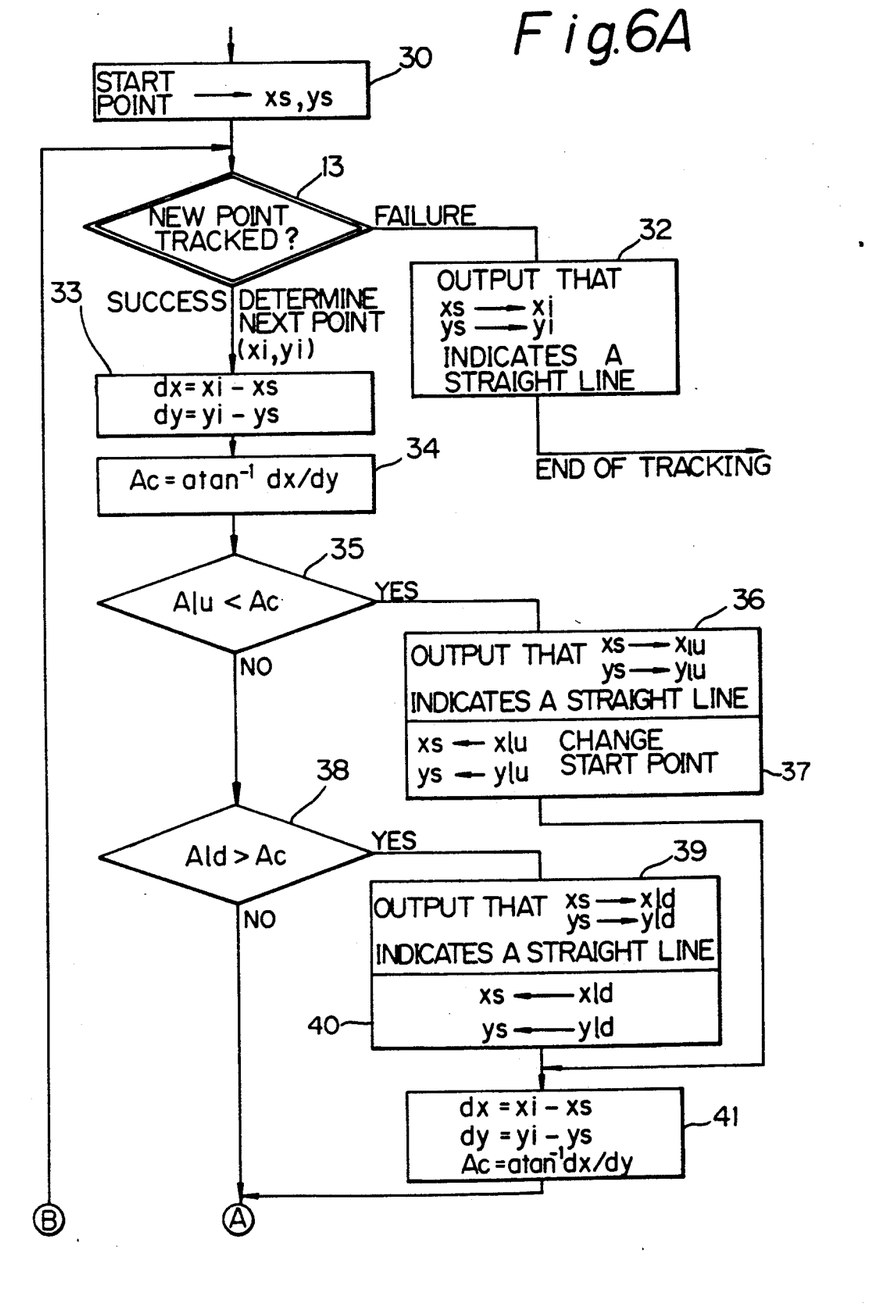
FIGS. 6A and 6B are flowcharts explaining in detail arithmetic operations for discriminating the linearity of a line segment in an image.
Figure 6B:
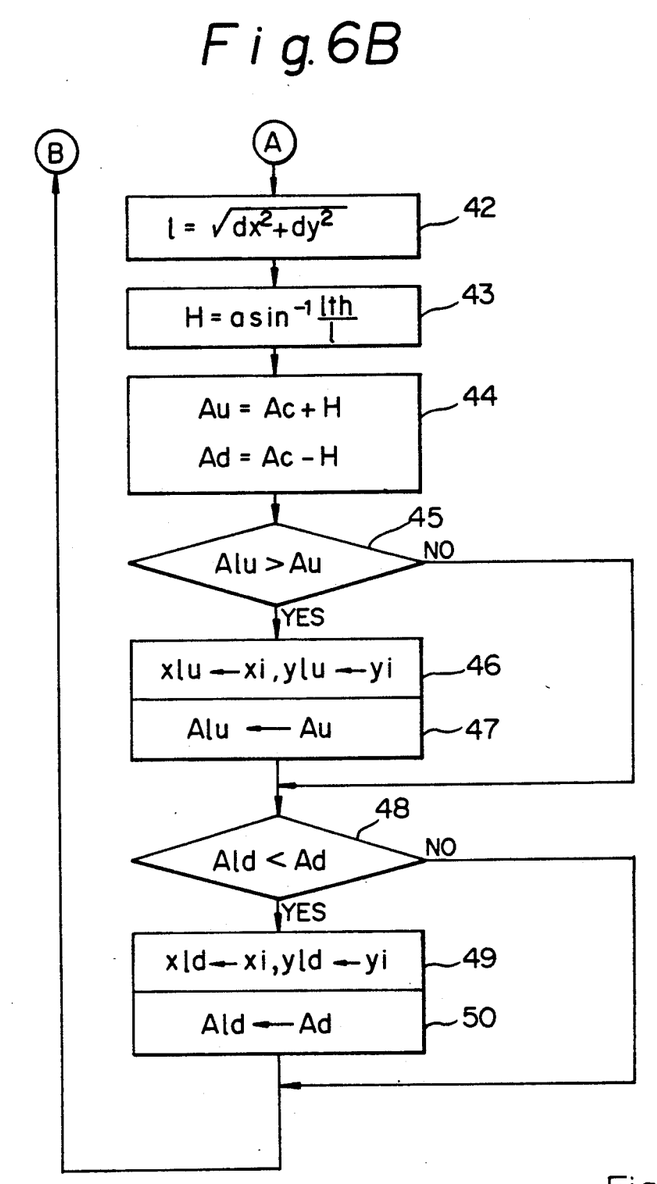
Figure 7:
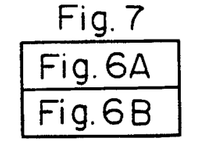
FIG. 7 is a block diagram showing the relationship between FIGS. 6A and 6B.

The discrimination of the linearity of the line segments as the subject matter of the present invention will now be explained in detail with reference to FIGS. 6A and 6B. First, the initial coordinate point $(x_s, y_s)$ to be tracked is instructed from the management processing section 11. The track processing section 13 can look up only one new point to be tracked a time. If no such new point exists and hence the tracking fails, the processing routine is advanced to block 32 in which a line segment up to the last tracked point, that is, a line segment from the coordinate point $(x_s, y_s)$ to the coordinate point $(x_i, y_i)$ can be output. Thus, the tracking is completed. On the other hand, when a new contour point is found by the tracking, the coordinate point $(x_i, y_i)$ is given to block 33 so as to obtain deviations $(d_x, d_y)$ from the initial coordinate point. In block 34, a center angle $A_c = a \tan^{-1} d_x/d_y$ is obtained. In block 35, an upper limit angle $A_{lu}$ which has been previously obtained is compared with the center angle $A_c$. If the center angle is larger than the upper limit angle $A_{lu}$, it is determined that the straight line has terminated. Then, the processing routine is advanced to blocks 36 and 37. In blocks 36 and 37, the line segment between the coordinate point $(x_{lu}, y_{lu})$ where the upper limit angle $A_{lu}$ which has been finally determined and the initial coordinate point $(x_s, y_s)$ is output as a straight line and then the coordinate point $(x_{lu}, y_{lu})$ is registered as a new initial coordinate point $(x_s, y_s)$.

In block 35, if the center angle $A_c$ is equal to or smaller than the upper limit angle, the routine is advanced to block 38 in which the center angle is then compared with a lower limit angle $A_{ld}$ which has been previously obtained. If the center angle is smaller than the lower limit angle in block 38, the routine is advanced to blocks 39 and 40. In block 39, the line segment between the coordinate $(x_{ld}, y_{ld})$ where the lower limit angle $A_{ld}$ has been obtained and the initial coordinate point $(x_s, y_s)$ is output as a straight line. In block 40, the coordinates $(x_{ld}, y_{ld})$ are then provided as a start point of the next straight line. In block 41, a center angle $A_c$ is newly obtained from the new start point and the current point. When the center angle $A_c$ is equal to or larger than the lower limit angle in block 38, and after block 41, the distance l between the starting point and the current point is obtained in block 42. In the next block 43, a displacement angle $$H = a \sin^{-1} \frac{lth}{l}$$

is calculated, where lth is the threshold value which is defined by the line segment D—D' shown in FIG. 3 in order to detect the change in direction of the train of points. The angle H is formed by the value lth and the distance l which correspond to the side facing the angle and the oblique side, respectively, of the right triangle concerned. In block 44, an upper angle $A_u$ and a lower angle $A_d$ are obtained by adding or substracting the displacement angle H to or from the center angle $A_c$.

If the upper angle $A_u$ is smaller than the upper limit angle $A_{lu}$, the coordinate point $(x_i, y_i)$ is stored as $(x_{lu}, y_{lu})$ in block 46 and the upper angle $A_u$ is provided as a new upper limit angle $A_{lu}$ in block 47. If the lower angle $A_d$ is larger than the lower limit angle $A_{ld}$, the coordinate point $(x_i, yi)$ is stored as $(x_{ld}, y_{ld})$ in block 49 and the lower angle is provided as a new lower limit angle in block 50.

Thus, the discrimination of the linearity of the line in the case where the new point $(x_i, y_i)$ is coupled to the tracked train of points is completed, and hence the processing routine is returned to block 13 and a similar operation is repeated for the succeeding points to be tracked.

The case where the coordinate point $(x_{lu}, y_{lu})$ is provided as a new starting point and the tracking operation is newly started from the point $(x_i, y_i)$ has been explained above. Although no practical inconvenience occurs with use of the above method, when considered strictly mathematically, it is preferably to newly track one point after another from the coordinate point $(x_{lu}, y_{lu})$.

Although the arithmetic operation in block 43 has been performed by utilizing the arcsine, there is no practical difference in accuracy when an arctangent is used instead.

In the embodiment described, the linearity of a line is discriminated each time one pixel is tracked. However, it is also possible to separately perform the tracking operation alone in a lump and to discriminate straight lines in a lump on the basis of the results of the tracking operations.

Although the embodiment has been explained with respect to a method whereby the tracking process and the linearity discrimination are arithmetically conducted by a computer, the object of the present invention is to realize a suitable apparatus as an electronic circuit and such can be easily constructed as an electronic circuit per se. It is apparent, therefore, that such an electronic circuit is included in the scope of the invention.

Further, the embodiment has been explained with respect to a case where, after a video signal is digitized, a train of points representing a contour of an image which displays a relatively large degree of bright/dark change is generated by differentiating and fine-line forming processes. However, it will be obvious that even if another method including a binarizing method is used, discrimination of the linearity of line segments as the subject matter of the present invention can be easily accomplished, and that the invention should not be limited to a method of generating a train of points.

What is claimed is:

1. An apparatus for discriminating linearity of a line segment in an image to be displayed which can be processed in an electronic image processing system, said apparatus comprising:
    means for extracting and tracking a train of points (A–F) from a portion of an image having a relatively large bright/dark contrast; and
    means for discriminating the linearity of said train of points, comprising:
    (a) means for obtaining a first point (B') spaced by a predetermined distance from a new point (B) on at least one side of said train of points, said new point added to said train of points by said extracting and tracking means;
    (b) means for obtaining a point (D) which precedes said new point (B) and a second point (D') spaced by said predetermined distance from said preceding point (D);
    (c) means for determining a first included angle ($\angle$B'AB) which is formed by a first line segment (BA) between said new point (B) and a start point (A) of said train of points and a second line segment (B'A) between said first point (B') and said start point (A);
    (d) means for determining a second included angle ($\angle$D'AD) which is formed by a third line segment (DA) between said preceding point (D) and said start point (A) and a fourth line segment (D'A) between said second point (D') and said start point (A); and
    (e) means for comparing said first included angle ($\angle$B'AB) with said second included angle ($\angle$D'AD) so as to detect the end of linearity of said train of points at said preceding point (D).

2. An apparatus for discriminating the linearity of a train of points extracted from a video in an image processing system comprising:
    a frame memory means for storing a train of points (A–F) representing at least a portion of said video image; and
    a processor means for discriminating the linearity of said train of points comprising:

means for detecting a new point (B) on at least one side of said train of points stored in said frame memory means, means for selecting a first point (B'), spaced a predetermined distance from said new point, means for selecting a point (D) preceding said new point and a second point (D') spaced by a predetermined distance from said preceding point, means for determining a first included angle (∠B'AB) which is formed by a first line segment (BA) between said new point (B) and a start point (A) of said train of points and a second line segment (B'A) between said first point (B') and said start point (A), means for determining a second included angle (∠D'AD) which is formed by a third line segment (DA) between said preceding point (D) and said start point (A) and a fourth line segment (D'A) between said second point (D') and said start point (A), and means for comparing said first included angle (∠B'AB) with said second included angle (∠D'AD) so as to detect the end of linearity of said train of points at said preceding point (D).

3. The apparatus of claim 2 wherein said processor means further comprises means for storing said first line segment (BA) in a second memory means when said first included angle (∠B'AB) exceeds said second included angle (∠D'AD).

4. The apparatus of claim 2 in combination with an analog to digital converter means for converting an analog video signal representing said video image into a digital signal.

5. The combination of claim 4 further in combination with a differentiating circuit means for generating a differentiated line representing a contrasting portion of said video image.

6. The combination apparatus of claim 5 further in combination with means for generating a fine line from said differentiated line.

7. The combination apparatus of claim 6 further in combination with a video signal source for producing an analog video signal representative of said video image.

8. A method of discriminating the linearity of a train of points (A-F) comprising the steps of:

determining if a new point (B) exists in said train of points;

selecting a first point (B') which is spaced a predetermined distance from said new point on at least one side of said train of points;

selecting a point (D) which precedes said new point on said train of points and a second point (D') spaced a predetermined distance from said preceding point;

calculating a first included angle (∠B'AB) which is formed by a first line segment (BA) between said new point and a start point (A) of said train of points and a second line segment (B'A) between said first point and said start point;

calculating a second included angle (∠D'AD) which is formed between a third line segment (DA) between said preceding point (D) and said start point (A) and a fourth line segment (D'A) between said second point (D') and said start point (A);

comparing said first included angle with said second included angle; and designating said first line segment as a straight line, when said first included angle exceeds said second included angle.

* * * * *